A. K. LOVELL.
SPRING TIRE FOR VEHICLE WHEELS.
APPLICATION FILED JULY 10, 1919.
1,385,629.
Patented July 26, 1921.
2 SHEETS—SHEET 2.
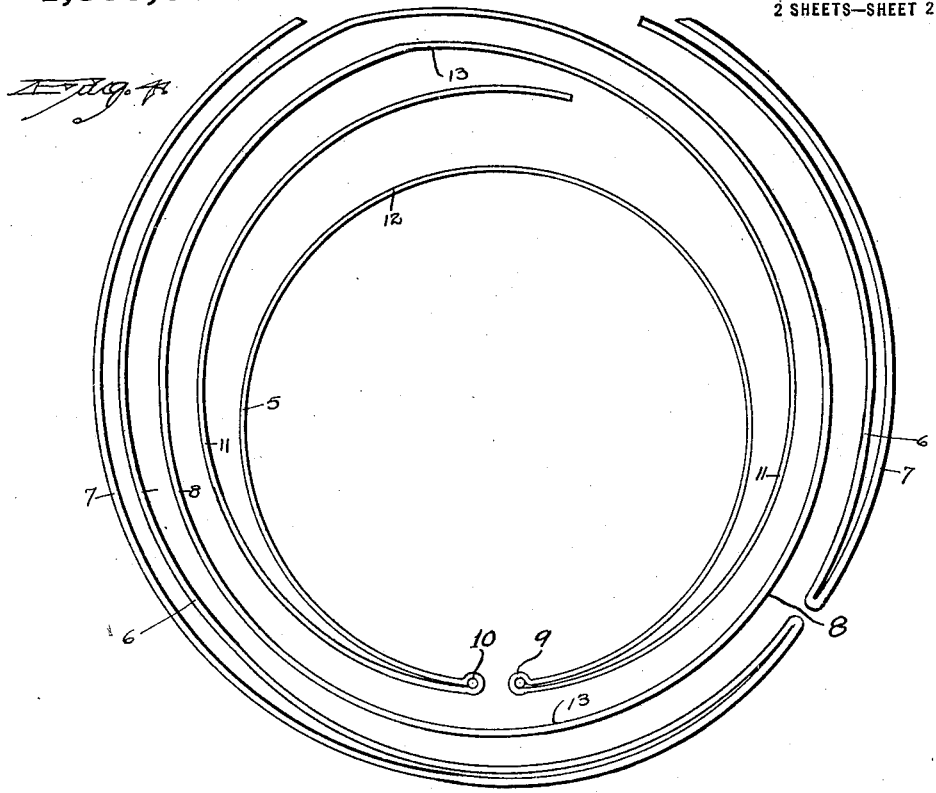

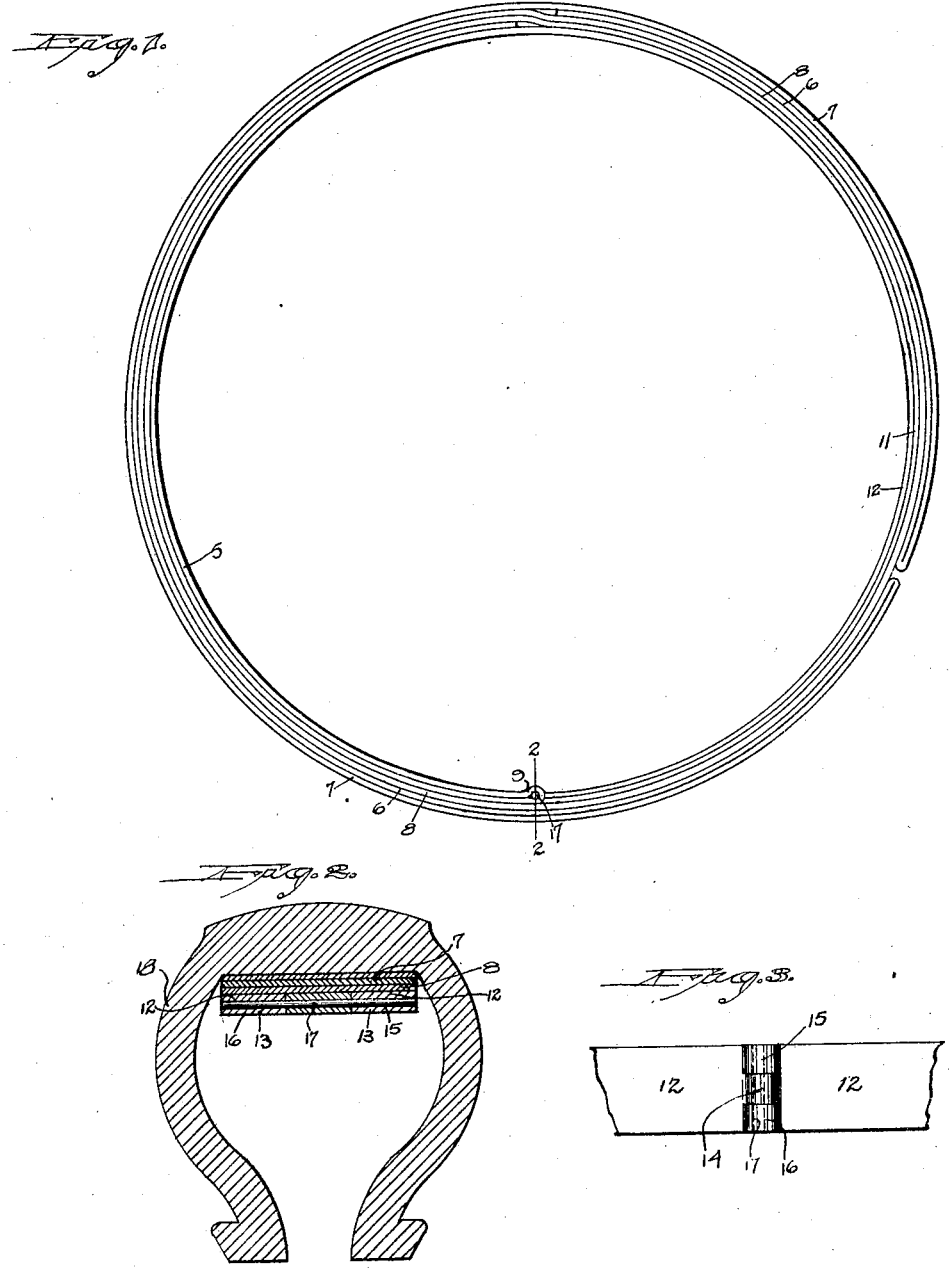

UNITED STATES PATENT OFFICE.

ALBERT K. LOVELL, OF NEW HARTFORD, CONNECTICUT.

SPRING-TIRE FOR VEHICLE-WHEELS.

1,385,629.   Specification of Letters Patent.   Patented July 26, 1921.

Application filed July 10, 1919. Serial No. 309,819.

*To all whom it may concern:*

Be it known that I, ALBERT K. LOVELL, a citizen of the United States, residing at New Hartford, in the county of Litchfield and State of Connecticut, have invented a new and useful Improvement in Spring-Tires for Vehicle-Wheels; and I do hereby declare the following, when taken in connection with the accompanying drawings, and the characters of reference marked thereon, to be a full, clear, and exact description of the same, and which said drawings constitute part of this application, and represent, in—

Figure 1 a side view of an inner spring band for auto shoes constructed in accordance with my invention.

Fig. 2 a sectional view on the line 2—2 of Fig. 1, showing the spring as arranged within a shoe.

Fig. 3 an inner view of the connected ends of the spring band.

Fig. 4 a side view of the spring with the ends disconnected and the convolutions separated to show the arrangement of parts.

This invention relates to an improvement in spring tires for vehicle wheels, the object being to arrange a spring within a shoe to take the place of inner pneumatic tubes now commonly employed; and the invention consists in the construction hereinafter described and particularly recited in the claims.

In carrying out my invention I employ a long band 5 of spring material the outer end 6 of which is folded back upon itself for the purpose as will hereinafter appear. The band is coiled to the predetermined size and again doubled upon itself and coiled in the opposite direction so that the end 6 extends between the inner face of the outer convolution 7 and the outer face of the next convolution 8 so as to be inclosed thereby, the object being to force the outer convolution outward. The band is then coiled and near one end is doubled back upon itself to form an eye 9, the band being then coiled in the reverse direction and then formed with an eye 10, the end 11 of the coil being continued in the reverse direction between the outer face of the inner coil 12 and the inner faces of the next adjacent coil 13. One of the eyes is cut to form a knuckle 14 and the other eye is cut to form knuckles 15 and 16 between which the knuckle 14 extends and through which knuckles a pin 17 may be passed to unite the said knuckles and form a hinge joint between them and prevent the contraction of the inner coil of the band. The spring thus formed is placed in a vehicle wheel shoe 18 of substantially usual form except that the inner face of the tread portion may be made flat to form a seat for the spring.

Before placing the spring in the shoe, the pin 17 is removed so as to disconnect the eyes and permit the coil to be contracted in size so as to be readily placed in the shoe, after which the strip is expanded so that the knuckles may be brought together and the band pressed into oval form and the pin inserted so as to firmly unite the eyes and prevent contraction of the inner convolutions of the spring, the outer convolutions being free to expand as required to maintain the shoe in an expanded position. My improved band avoids the use of an inner pneumatic tube and injury by puncture or blow-outs is avoided. While I prefer to form the band from spring metal, it may be formed from bent wood or leather reinforced by spring wires or otherwise, as desired.

I claim:—

1. A spring tire comprising a band doubled upon itself near one end, the band given a convolution and again reversed and coiled within the outer convolution, the band near its inner end doubled to form an eye, and then continued in a reverse direction to form a convolution of predetermined size and again doubled to form an eye, the inner end of the band being turned backward and outside the inner convolution, and means for connecting said eyes.

2. A spring tire comprising a band doubled upon itself near one end, the band given a convolution and again reversed and coiled within the outer convolution, the band near its inner end doubled, to form an eye, and then continued in a reverse direction to form a convolution of predetermined size and again doubled to form an eye, the inner end of the band being turned backward and outside the inner convolution, the said eyes being formed with interlocking knuckles and a pin extending through said knuckles whereby they are connected together.

In testimony whereof, I have signed this specification in the presence of two subscribing witnesses.

ALBERT K. LOVELL.

Witnesses:
FREDERIC C. EARLE,
C. L. WEED.